United States Patent [19]
Onodera

[11] 4,118,181
[45] Oct. 3, 1978

[54] BAKING APPARATUS

[76] Inventor: Hirosuke Onodera, No. 340, Mizuhai, Higashi-osaka-shi, Osaka-fu, Japan

[21] Appl. No.: 770,761

[22] Filed: Feb. 22, 1977

[30] Foreign Application Priority Data

Dec. 11, 1976 [JP] Japan .............................. 51-167921[U]

[51] Int. Cl.² .............................................. F27B 9/00
[52] U.S. Cl. ........................................ 432/121; 432/2; 432/143; 432/147
[58] Field of Search .................... 432/2, 121, 143, 144, 432/145, 147

[56] References Cited

U.S. PATENT DOCUMENTS

| 2,797,075 | 6/1957 | Wilbur | 432/121 |
| 3,947,241 | 3/1976 | Caridis et al. | 432/121 |

Primary Examiner—John J. Camby
Attorney, Agent, or Firm—Wenderoth, Lind & Ponack

[57] ABSTRACT

A baking apparatus for breads, cakes and the like includes a housing, a drum vertically and rotatably mounted within the housing, a spiral guide passage provided adjacent and along the periphery of the drum, a flexible endless belt conveyor advancing along the spiral guide passage, and heating elements disposed below and along the spiral guide passage. The flexible conveyor is ventilative and is driven by the drum which serves as a pin wheel, each pin engaging each projections provided at the inner side of the flexible conveyor.

7 Claims, 4 Drawing Figures

BAKING APPARATUS

BACKGROUND AND SUMMARY OF THE INVENTION

The present invention relates to a baking apparatus for breads, cakes and the like.

In a conventional apparatus for baking breads or the like succesively and automatically, a straight conveyor line is provided through an elongated oven so that the dough put on the conveyor is baked while passing through the oven. Apparently, this requires much space and many workers to operate and watch the conveying line.

Accordingly, it is an object of the present invention to obviate the above defects and to provide a baking apparatus which saves space and requires fewer operators.

BRIEF DESCRIPTION OF THE DRAWINGS

Other objects and features of the present invention will be apparent from the following description of the invention with reference to the accompanying drawings, in which.

DETAILED DESCRIPTION OF THE INVENTION

Figure 1:
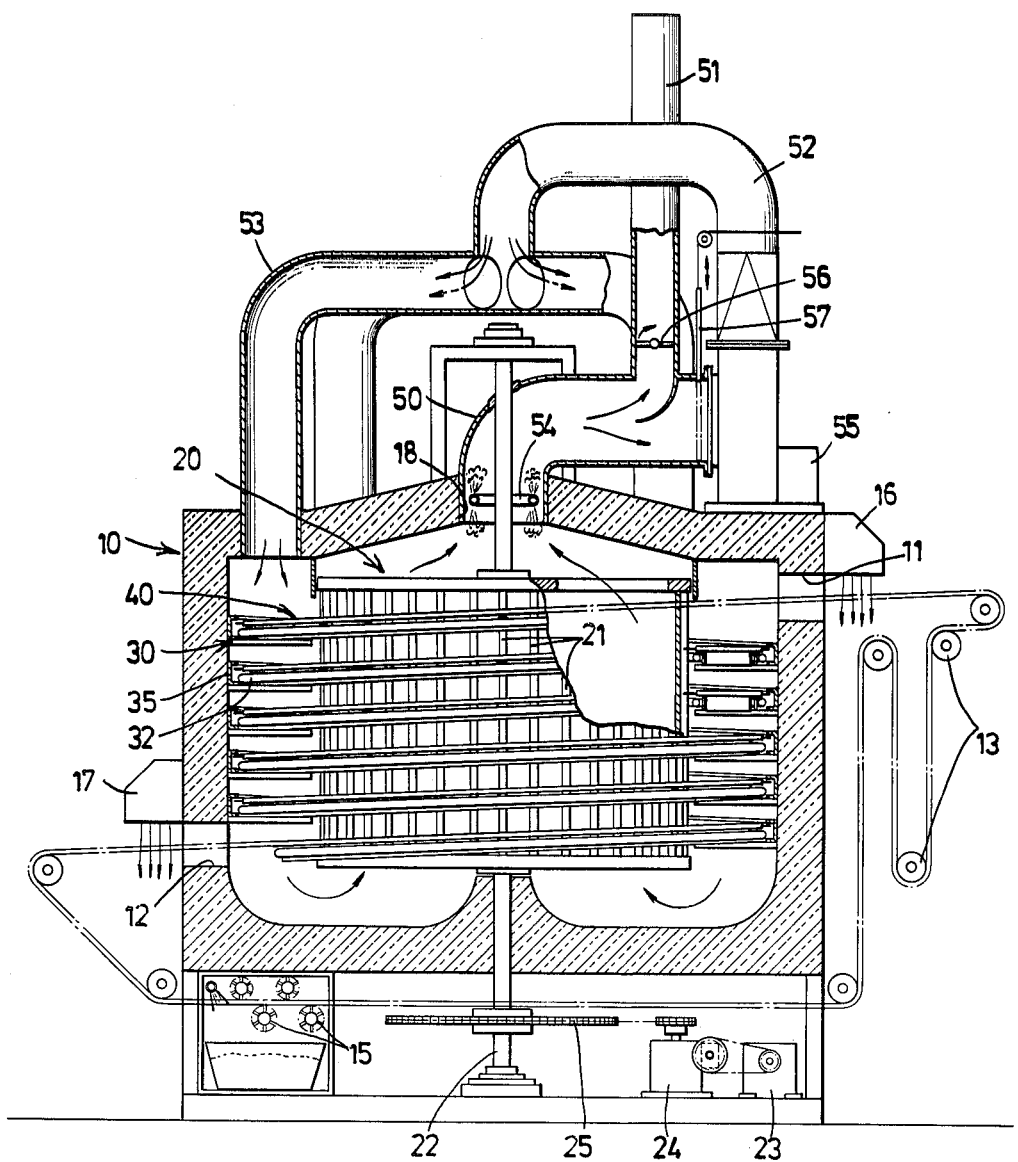
FIG. 1 is a longitudinally sectioned view showing a baking apparatus according to the invention.
Figure 2:
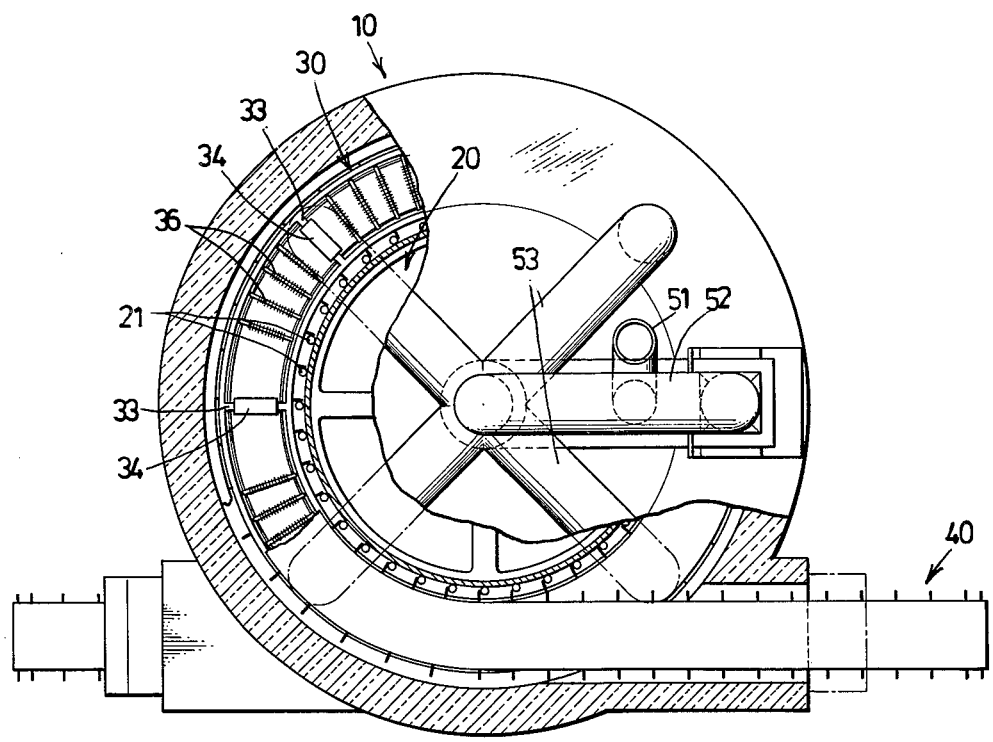
FIG. 2 is a plan view, partially broken, of a baking apparatus of the invention.

Referring now to FIGS. 1 and 2, a baking apparatus of the invention generally comprises a housing 10 made of heat insulation material, a rotary drum 20 having vertical axis, a spiral guide passage 30 adjacent and along the periphery of the drum 20, and a flexible, ventilative endless conveyor 40 advanced along the spiral guide passage 30 by the drum 20.

The drum 20 rotatably mounted within the housing 10 has axially arranged, equally spaced rods 21 about its periphery so as to serve as a pin wheel. A rotary shaft 22 of the drum is driven by a motor 23 through a variable transmission 24 and chain-sprocket connection 25.

Figure 3:
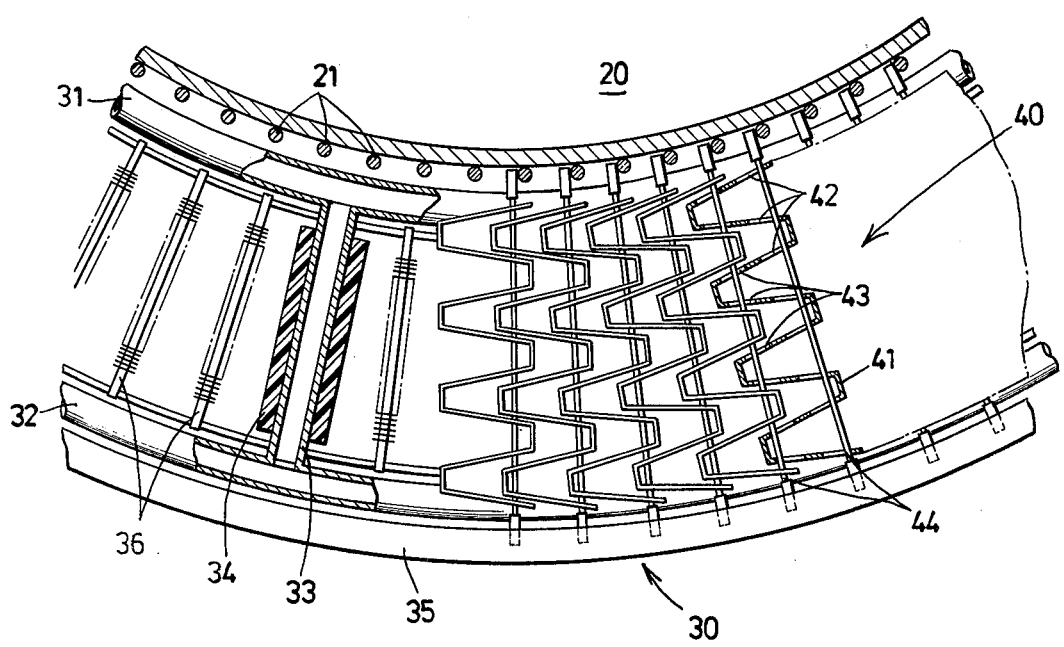
FIG. 3 is an enlarged plan view, partially broken, of a spiral guide passage for guiding a flexible conveyor.

As best seen in FIG. 3, the spiral guide passage 30 is a pair of parallel pipes 31 and 32 communicating with each other through transverse pipes 33 which are fixed to the pipes 31 and 32 at predetermined spaces. A roll 34 is rotatably mounted about each of the transverse pipes 33; a guide member 35 is disposed along the outer pipe 32; and the member 35 has an inwardly directed lateral channel. Heating elements 36, such as a coil of nichrome wire, a infrared heater or a gas burner are provided between the adjacent pipes 33 below the level of rolls 34. Preferably, each of the rolls 34 is made of self-lubricating synthetic resin such as Hostalengur (Trademark, Hoechst Co. West Germany).

An example of the flexible conveyor 40 is illustrated in FIG. 3. As shown, a corrugated plate 41 has lateral slots 42 and 43. The slots 42 are arranged in a row so as to permit insertion of a connecting rod 44. These plates 41 are connected to one another by inserting rods 44 therethrough, thus forming the flexible conveyor 40 which can be curved along the spiral passage 30 since the lateral slots 42 and 43 permit the spaces between the rods 44 to outwardly widen. In place of this conveyor, there can be used any other flexible conveyor such as an elastic screen with supporting rods transversely fixed thereto.

Figure 4:
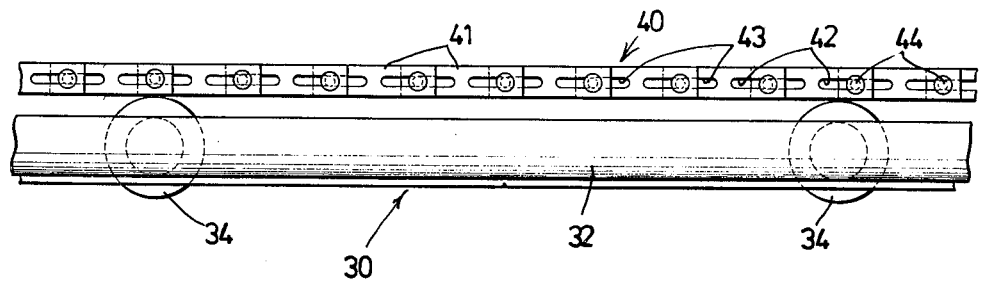
FIG. 4 is an enlarged side view of the above.

The conveyor 40 is supported on the rolls 34 as shown in FIG. 4. Each of the transverse rods 44 is engaged at one end to each of the rods 21 of the drum 20 and is engaged at the other end to the channel of guide member 35 (FIG. 3), whereby the conveyor 40 advances along the spiral guide passage 30 by the rotation of the drum 20.

As shown in FIG. 1, the conveyor 40 comes out of the housing 10 through an outlet 11 and runs towards an inlet 12 of the housing 10 along a plurality of guide rolls 13, during the time outside the housing it is cleaned by means of brushes 15.

At the outlet 11 and inlet 12, there can be provided air ejectors 16 and 17, respectively, so as to prevent the heat inside the housing 10 from escaping.

If desired, wet air or steam can be supplied in the housing 10. As shown in FIG. 1, an opening 18 of the housing 10 is connected to a duct 50 which communicates with an exhaust duct 51 and a steam supplying duct 52 which is further connected to a plurality of distributing ducts 53 communicating with the inside of the housing 10. In the duct 50 is there a steam ejector 54; duct 52 has a blower 55, and in the duct 51 is a first damper 56. At the connecting portion of the ducts 50 and 52 is a second damper 57. The amount of wet air supplied is adjusted by alternately closing and opening the first and second dampers.

In operation of the apparatus, initially a cooling fluid such as water is supplied to the pipings 31, 32 and 33, and electricity or gas to the heating elements 36. Then the drum 20 is rotated by the motor 23, thereby advancing the conveyor 40 along the spiral guide passage 30. After the temperature in the housing 10 is raised to a predetermined point, the dough is put on the conveyor 40 and baked while passing along the spiral passage 30.

According to the present invention as described hereinbefore in detail, the baking apparatus can be smaller in dimensions since the conveyor with the dough thereon is adapted to run along the spiral passage, thus making it possible to save installation space as well as requiring fewer operators.

What is claimed is:

1. A baking apparatus comprising:
   a housing having an inlet and an outlet;
   a rotary drum having a vertical axis positioned within said housing, said drum being rotatable about said vertical axis;
   a plurality of equally spaced vertical rods affixed to and surrounding the circumference of said drum;
   a spiral passage spiralling upward around the outside of said drum, said passage extending from said inlet to said outlet inside said housing;
   drive means connected to said drum for rotating said drum;
   a flexible endless conveyor on said spiral passage contacting said spaced vertical rods and movable along said passage from said inlet to said outlet during rotation of said drum;
   guide roll means between said outlet and said inlet on the outside of said housing and engaging said conveyor for returning said conveyor from said outlet to said inlet; and
   heating means along said spiral passage inside said housing for heating the inside thereof.

2. A baking apparatus as claimed in claim 1, wherein said spiral passage is comprised of:
   parallel hollow pipes spiralling upward around said drum;
   a plurality of hollow transverse pipes connected between and communicating said parallel pipes; and
   at least one roll rotatably mounted around each of said transverse pipes.

3. A baking apparatus as claimed in claim 2, further comprising a cooling fluid supply means connected to said hollow, parallel and transverse pipes for supplying a cooling fluid to said pipes.

4. A baking apparatus as claimed in claim 1, further comprising air ejecting means at both said inlet and said outlet for providing an air curtain to keep heat inside said housing.

5. A baking apparatus as claimed in claim 1, further comprising steam supply means inside said housing for supplying moisture into said housing.

6. A baking apparatus as claimed in claim 1, further comprising brushing means outside of said housing and contacting said conveyor for brushing said conveyor.

7. A baking apparatus as claimed in claim 1, wherein said heating means is comprised of a plurality of electric heating elements positioned along said spiral passage.

* * * * *